J. ALSFASSER.
DAMPER LOCK.
APPLICATION FILED MAY 11, 1916.
1,223,133. Patented Apr. 17, 1917.
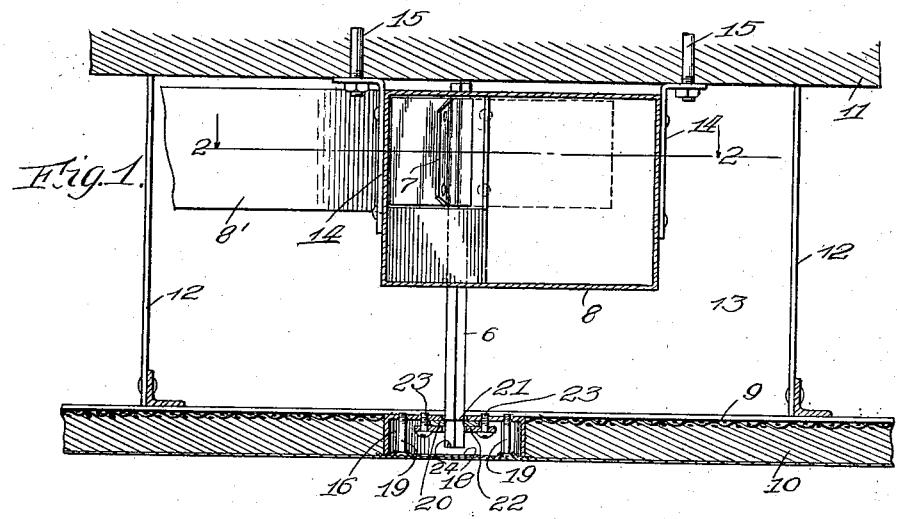
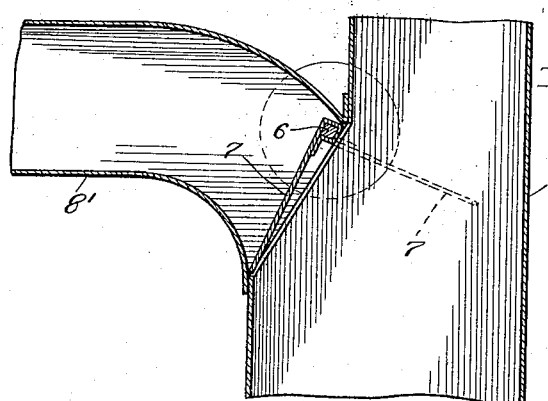
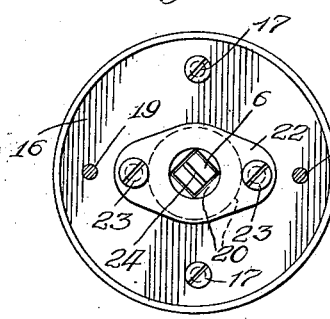
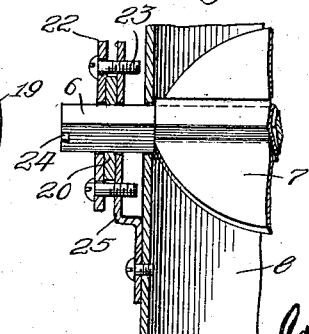
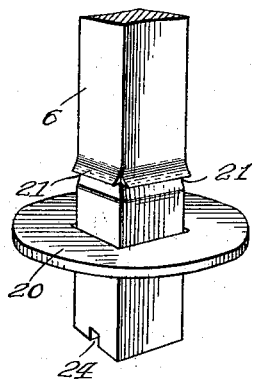
Witness:
R. L. Farrington
Inventor
Joseph Alsfasser
By Torrence, Nielson & Spindle
Attys.

UNITED STATES PATENT OFFICE.

JOSEPH ALSFASSER, OF CHICAGO, ILLINOIS.

DAMPER-LOCK.

1,223,133.  Specification of Letters Patent.  Patented Apr. 17, 1917.

Application filed May 11, 1916. Serial No. 96,744.

*To all whom it may concern:*

Be it known that I, JOSEPH ALSFASSER, a citizen of the United States, residing at Chicago, in the county of Cook and State of Illinois, have invented certain new and useful Improvements in Damper-Locks, of which the following is a specification.

My invention relates to damper locking means and has for its object the provision of simple and efficient means for adjusting and locking dampers in their ducts. Other objects will appear hereinafter.

An embodiment of my invention is shown in the accompanying drawing, forming a part of this specification, and in which—

Figure 1 is a fragmental vertical section of a floor construction having a damper mounted therein with locking means embodying my invention.

Fig. 2 is a fragmental view taken on line 2—2 of Fig. 1.

Fig. 3 is an enlarged view looking upwardly toward the end of the damper spindle in Fig. 1.

Fig. 4 is an enlarged fragmental view of one end of the damper spindle and disk carried thereby; and Fig. 5 is a section of a slightly modified form of means for mounting the damper lock.

Referring more particularly to the drawing, a damper spindle 6 of any preferred cross section, is mounted on a suitable damper 7 in any desired or suitable duct 8. In the form shown in Fig. 1, the duct 8 is hidden behind a ceiling construction made up of expanded lath 9 and plaster 10, or their equivalent. The ceiling is secured below the floor construction 11 by hanger rods 12 or any other suitable construction. In fireproof constructions of buildings, the ceiling is ordinarily spaced slightly below the floor proper in order to give a space 13 in which are mounted air circulating ducts, and any other desired devices, not shown. The duct 8 may be supported from the floor 11 in any convenient manner. I have shown ears 14 secured to the sides of the duct and fastened to the ceiling by means of bolts 15. I have shown the duct 8 as having a branch 8' with communication between the duct 8 and its branch 8' controlled by the damper 7. In constructions of this sort, it is desirable to extend the damper spindle 6 to a position where the damper can be operated and locked from below the ceiling 10. I therefore extend my damper spindle downwardly into an opening in the plaster which is stopped by a cup 16 secured to the expanded metal lath, or its equivalent, by means of screws 17. The cup 16 provides means for housing my improved locking means and also for protecting the end of the damper spindle 6. The outer side of the cup 16 is preferably closed by a plate 18 secured to the cup by screws 19, or their equivalent. The arrangement is such that the outer surface of plate 18 is preferably in a plane with the outer surface of the plaster 10. This permits the wall to be finished over by painting or otherwise to hide the locking means for the damper.

The locking mechanism comprises a disk 20 which has a perforation therein adapted to fit the cross section of the damper spindle 6, so that rotation of the damper spindle will cause the disk 20 to be rotated therewith. In the form shown, I have shown the damper spindle square in cross section and a square perforation in the disk 20 to fit it. The shaft is held against downward movement by having shoulders 21 formed thereon. The shoulders 21 may be formed by roughening up the shaft with a cold chisel, not shown, or any other suitable tool. The gravity of the spindle prevents it from moving upwardly. This arrangement maintains the lower end of the damper spindle always in proper position to be engaged by a suitable wrench, not shown, for adjusting the damper.

In the form shown in Fig. 1, the disk 20 is clamped against the bottom of cup 16 by a plate 22 held by screws 23 which pass through the plate and are threaded in the bottom of the cup 16. The perforations in plate 22 and the bottom of cup 16 are of such sizes as will permit the spindle 6 to turn freely therein. When screws 23 are tightened against disk 20, the latter holds the damper and damper spindle against rotation. It will also be noted that the cup 16 may be shifted around the spindle 6 until the holes in the cup come over a solid portion of the ceiling, due to the circular contour of the disk 20, thereby facilitating installing the device.

In Fig. 5 I have shown a slightly modified mounting for my lock, which comprises a plate 25 secured to the outer side of the duct 8. In the duct is a damper 7 on a spindle 6 which extends through the duct and plate 25. On the damper spindle is a disk 20 which is held against the plate 25 by a plate 22 and screws 23 in the same manner as the form shown in Fig. 1. This latter form is adapted for use in locking dampers where the ducts are exposed.

While I have illustrated and described the preferred form of my construction, I do not desire to be limited to the precise details set forth, but desire to avail myself of such variations and changes as come within the scope of the appended claims.

I claim:

1. In combination, a duct; a damper spindle disposed through and journaled in said duct; a rigidly mounted member having a perforation therein through which the damper spindle extends; a plate substantially parallel with the outer surface of said member and having a perforation therethrough in which the damper spindle extends; a disk on the damper spindle fixed to rotate therewith and disposed between said member and plate; and screws extending through said plate, threaded in said member and clamping the disk for holding the latter and damper spindle against rotation.

2. In combination, a duct; a cup mounted at one side of the duct with its open side directed away from said duct; a damper spindle extending through the duct and into the cup; a plate in the cup having an opening therein engaging the damper spindle; a disk between the bottom of the cup and plate, fixed on the damper spindle to turn with the latter; means securing the plate to the cup and clamping the disk between the plate and cup; and a lid secured on the cup closing the latter.

In testimony whereof I have signed my name to this specification on this sixth day of May A. D. 1916.

JOSEPH ALSFASSER.

Copies of this patent may be obtained for five cents each, by addressing the "Commissioner of Patents, Washington, D. C."